J. W. HUNTLEY.
Cotton-Planter.
No. 25,119. Patented Aug. 16, 1859.
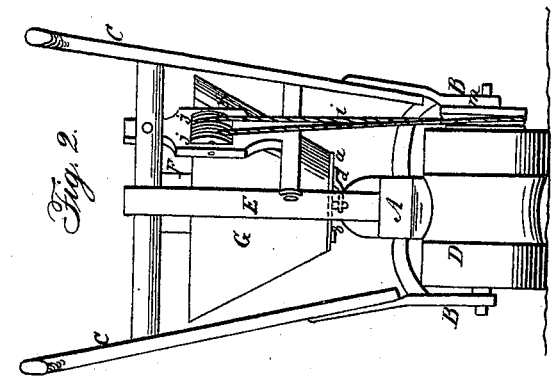
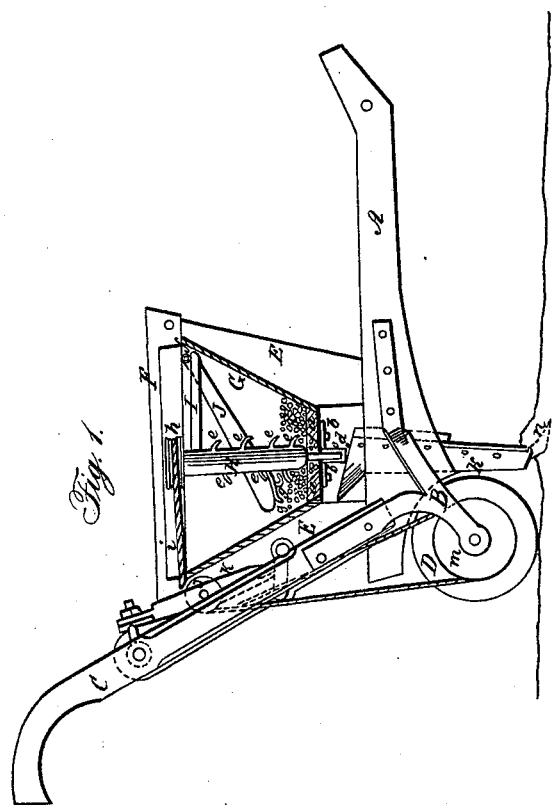
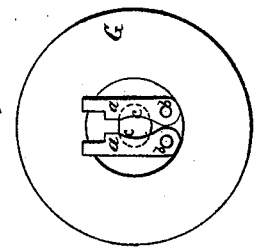
Witnesses:
D H Huyden
J. D. Winchester
Inventor:
John W Huntley

UNITED STATES PATENT OFFICE.

JOHN W. HUNTLEY, OF LANE'S CREEK, NORTH CAROLINA.

IMPROVEMENT IN COTTON-SEED PLANTERS.

Specification forming part of Letters Patent No. 25,119, dated August 16, 1859.

*To all whom it may concern:*

Be it known that I, JOHN W. HUNTLEY, of Lane's Creek, in the county of Union and State of North Carolina, have invented a new and Improved Cotton-Seed Planter; and I do hereby declare that the following is a full, clear, and exact description of the same, reference being had to the annexed drawings, making a part of this specification, in which—

Figure 1 is a side view of my invention, the hopper being bisected vertically and centrally. Fig. 2 is a back view of my invention. Fig. 3 is a detached inverted plan of the hopper or seed-box of the same.

Similar letters of reference indicate corresponding parts in the several figures.

This invention relates to an improved means employed to insure the proper distribution of the seed from the hopper by preventing the seeds adhering together in consequence of the fine short fibers, which are attached to them in a greater or less degree, and which has hitherto rendered the planting of cotton-seed by a machine extremely difficult and uncertain.

My invention consists in the employment or use of a vertical rotating arbor or shaft placed centrally within a conical hopper or seed-box armed with teeth and used in connection with a follower and gatherer, the parts being arranged as hereinafter fully described, whereby the desired end is attained.

To enable those skilled in the art to fully understand and construct my invention, I will proceed to describe it.

A represents a beam, to the front end of which the draft-gear is attached, and to the back end curved metal bars B B, to which the handles C C are attached, the lower ends of said bars serving as bearings for a roller, D, the periphery of which is of concave form, as shown clearly in Fig. 2. The roller D supports the device and covers the seed.

To the beam A two inclined supports, E E, are attached, the upper ends of which are connected by a bar, F. Between the inclined supports E E a conical hopper, G, is attached, the lower end of which is a short distance above the beam A. This hopper has two plates, *a a*, attached by pivots *b* to its bottom, said plates having notches or recesses *c* made in their edges, which recesses or notches form an aperture through which the seed escapes, said aperture being made larger or smaller, as may be required, by adjusting the plates nearer to or farther from each other. This will be fully understood by referring to Fig. 3.

Within the hopper G a vertical shaft, H, is placed centrally. The lower end of this shaft is stepped in an arm, *d*, attached to the lower end of the hopper, and the upper end has its bearing in the bar F. The shaft H has short curved arms or teeth *e* attached, said arms or teeth being slightly inclined downward, as shown clearly in Fig. 1.

To the upper part of the shaft H a horizontal arm, I, is attached, said arm extending outward nearly to the side of the hopper, and having a bar, J, attached by a link or joint, *f*, as shown clearly in Fig. 1. To the under side of the bar J a series of hook-shaped teeth or projections, *g*, are attached, the form of which is shown clearly in Fig. 1.

On the upper part of the shaft H a pulley, *h*, is placed, and around this pulley a cord, *i*, passes, said cord also passing over two pulleys, *j j*, in an adjustable bar, *k*, attached to traverse pieces *l*, the cord also passing around a pulley, *m*, at one end of roller D.

In the beam A a tube, K, is placed, said tube being in line with the bottom of the hopper G, and having a furrow-share, *n*, formed on its lower end, as shown clearly in Fig. 1.

The operation is as follows: The hopper G is supplied with a requisite quantity of cotton-seed, the plates *a a* adjusted at the bottom of the hopper, so as to regulate the size of the discharge-opening, as may be desired. The bar J rests on the top of the seed. As the machine is drawn along the shaft H is rotated from the roller D, the bar J moves around on the top of the seed, and the teeth *g* on said bar draw the seed toward the shaft H, the arms or teeth *e* of which work or ripple the seed down through the discharge-orifice between the plates *a a* at the bottom of the hopper, the plates *a a*, as before stated, being adjusted so as to regulate the discharge of the seed as may be required. The seed drops through the tube K into the furrow made by the share *n*, and the roller D covers the seed and compresses the earth firmly on it.

By the employment or use of the toothed shaft H and bar J the proper distribution of the seed from the hopper is effected. The bar J performs the double function of a follower and gatherer, the former function being effected by its weight as it passes around within the hopper and the latter function performed by the teeth $g$, which draw the seed within the path of rotation of the teeth or arms of shaft H.

By this invention the difficulty attending the adhering of the seed together in consequence of the fine fiber attached to them is fully obviated, and cotton-seed may be planted equally as well as other seeds by other machines.

I do not claim the pressure-roller D with a concave periphery, for that has been previously used; but,

Having thus described my invention, what I do claim new, and desire to secure by Letters Patent, is—

The vertical rotating toothed shaft H, in connection with the follower or gatherer J, placed within the hopper G, and arranged for joint operation, substantially as for the purpose set forth.

JOHN W. HUNTLEY.

Witnesses:
D. F. HAYDEN,
T. D. WINCHESTER.